UNITED STATES PATENT OFFICE.

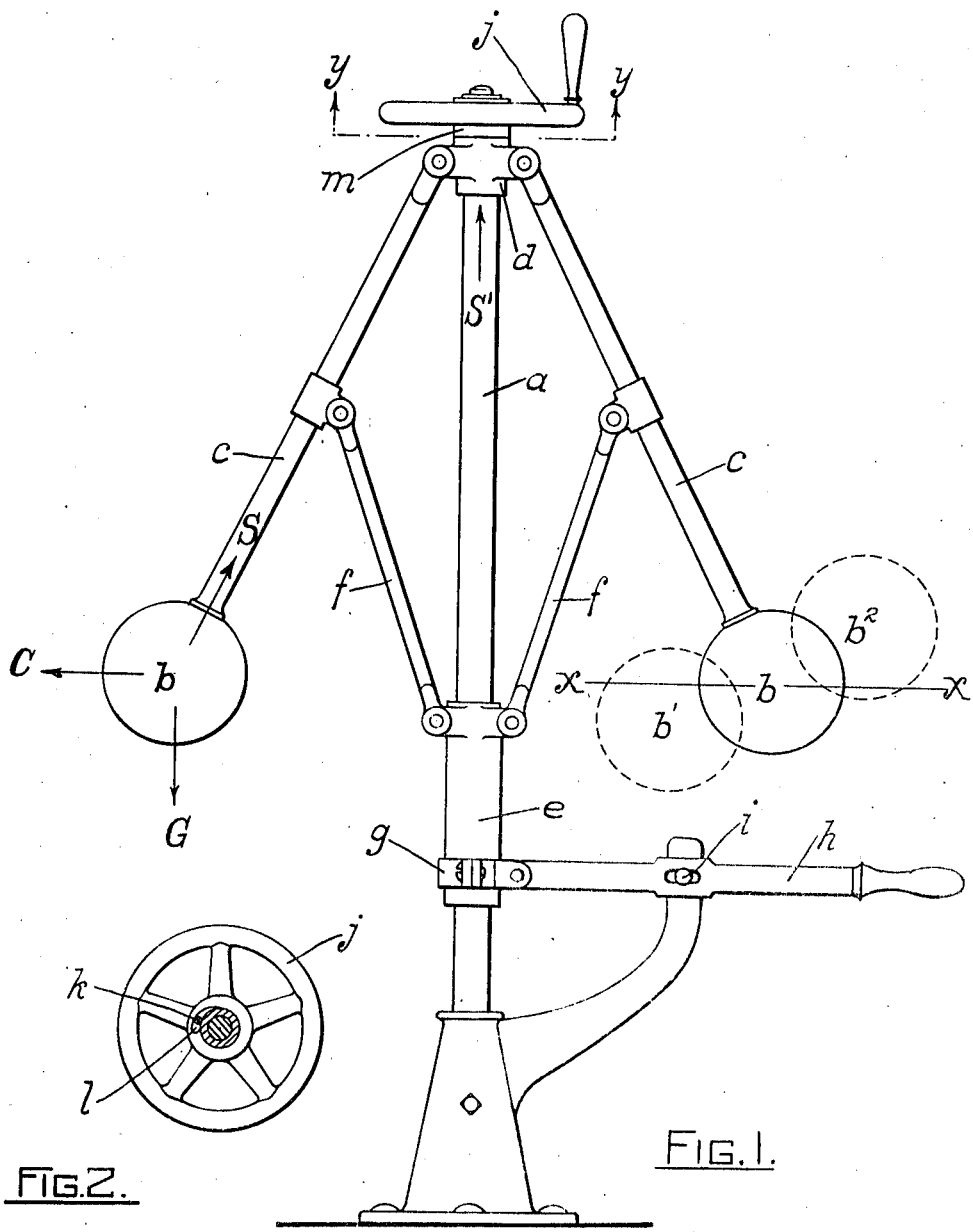

SOCRATES SCHOLFIELD, OF PROVIDENCE, RHODE ISLAND.

APPLIANCE FOR ILLUSTRATING THE SPECIFIC RELATION THAT EXISTS BETWEEN THE FACULTIES OF SENSATION AND EMOTION IN THE ANIMAL ORGANISM.

1,019,703. Specification of Letters Patent. Patented Mar. 5, 1912.

Application filed November 4, 1909, Serial No. 526,298. Renewed August 1, 1911. Serial No. 641,697.

*To all whom it may concern:*

Be it known that I, SOCRATES SCHOLFIELD, a citizen of the United States, residing at Providence, in the State of Rhode Island, have invented a new and useful Appliance for Illustrating the Specific Relation that Exists between the Faculties of Sensation and Emotion in the Animal Organism, of which the following is a specification.

When teaching pupils in schools the evidences of immortality that are derived from the data of practical mechanics and biology, it is desirable to illustrate certain of these evidences by means of schematic mechanical appliances. And to this end the invention herein set forth, consists in an educational appliance adapted for use in imparting to the pupils of the school, a clear conception of the relation that exists between the faculties of sensation and emotion in the resilient controlling element of conscious sensibility, to which the attribute of immortality belongs. And in order to properly describe the nature and use of this appliance, it will be necessary to first set forth, in mechanical terms, certain fundamental ideas concerning the faculties of sensation and emotion, that are to be illustrated thereby.

In the terminology of practical mechanics, the words sensible and sensitive are used to characterize those material resilient elements which, through their quality of automatic reaction, are adapted to indicate the varying conditions of an impinging energy. And we may employ the word sensive to specifically denote the sensible and sensitive elements which pertain to consciousness. Also, in referring to the parts of those inanimate machines which are adapted for the discriminate dispensation of energy under varying conditions we may employ the word enginery, to denote that portion of the mechanism in which the energy to be dispensed is embodied, and the words governor, and governing mechanism, to specify that portion which serves to supervise and control the dispensation of the energy to meet the varying conditions. And these terms are in equal degree applicable to the corresponding parts in animal organisms. But in order to provide a term which will denote a distinction between animate and inanimate governing mechanisms, the animate governing mechanism may be called the governing member.

It is scientifically maintained that the phenomenon of animal consciousness is the result of constantly recurring changes or alternations of state occurring in a resilient controlling element of conscious sensibility, in which the state of stress which is the basis of consciousness inheres. And since animal consciousness is completely annihilated in sleep, and is likewise excluded upon physical interference with the flow of blood in the brain, and does not persist continuously in the governing element, we may logically conclude that animal consciousness is the result of the action of certain forms of energy upon the resilient controlling element of conscious sensibility in the governing member of the organism.

The governing pendulum of a clock receives at each oscillation a slight impulse from the enginery, which serves to overcome the encountered frictional resistance, and thus maintain the successive rising and falling movements of the pendulum weight as it swings back and forth in its curvilinear path, with the resulting production of alternating changes of gravitational stress during these rising and falling movements. And we may reasonably posit that analogous mechanically induced changes of stress in the resilient controlling element of conscious sensibility in the governing member of an animal organism will form the basis of a true consciousness.

We find that certain mechanical governing mediums, like the oscillative pendulum of a clock are adapted for resilient action upon either side of their median plane of static equilibrium. So, likewise, the resilient controlling element of conscious sensibility in the governing member of an animal organism has a mediate state of static equilibrium and consequent insensibility, to which it returns automatically when freed from the deflecting action of either direct or inverse energies.

It is well known that by means of a resilient mechanical governor, man is able to impart to material mechanism the power of discriminating movement, which is a function of his own organism, thus enabling the inanimate machine to perform certain actions parallel with his own; and this discriminating movement is always dependent upon the resiliency or stress which results in the governing element of the machine, when subjected to the action of either external or internal energies.

Now if animal consciousness depends upon the existence of stress and resiliency in the controlling element of conscious sensibility in the governing member, we ought to be able to point out in some of the governors of inanimate machines, an example of sensible action, which can be considered as analogous to that developed in the conscious governing member of the animal organism.

Adopting the rotary pendulum governor as a suitable illustration, we find that it includes oppositely arranged balls of matter, acted upon by the uniform force of gravity, an adverse force of suspension, and a force of rotation which develops a centrifugal force within the governor, tending to carry the balls outwardly from under the point of suspension until a complete balance of the gravitative, suspensory and centrifugal forces has been attained. We thus have in the rotary pendulum governor, a balanced series of forces, two of which—the centrifugal force and the force of gravitation—are capable of sensible reaction against external impinging energies which tend to disturb their equilibrium.

When we employ the sliding sleeve of the rotary pendulum governor as the representative of an organ of sense, by means of which the balanced forces of the governor may be mechanically influenced to a state of resistance or reaction, and impart an impulse to the sliding sleeve from an external source of energy, then the equilibrium between the gravitative and centrifugal forces will be disturbed, with the resulting development of stress in the mechanism of the governor. But the analogous development of stress in the resilient controlling element of conscious sensibility in the animal organism, has been considered as a fundamental element in the production of conscious sensation. And, since the resilient controlling element of conscious sensibility is adapted for feelings of emotion as well as of sensation, we will be required to schematically illustrate by means of the structural elements of our adopted rotary pendulum governor, both the sensational and emotional faculties of the governing member of the animal organism.

The impelling incentive for the construction and use of the rotary pendulum governor for the regulation of the speed of machinery is the emotion of fear. For, whenever the speed of the motive engine of a factory is caused to vary at any time from its proper zero rate, by the effect of occurring changes in mechanical resistance, the fear of an impending unallowable variation of speed demands an immediate regulating action to check and limit such variation. Hence the rotary pendulum governor when employed as a medium for the regulation of the speed of machinery in a factory, will constitute a true mechanical representative of the faculty of emotion.

In the accompanying drawing, Figure 1 represents the side view of a rotary pendulum governor embodying the invention; and Fig. 2 represents a detail cross-section taken on the line y—y, of Fig. 1.

In the drawing a is a stationary upright spindle; b, b, the spherical balls of the governor; c, c, the downwardly extending arms of the pendulums; d, a jointed supporting collar for the arms; e, the sliding sleeve; f, f, the links which serve to connect the sliding sleeve with the arms; g, a strap loosely held in a groove; h, a hand lever jointed to the strap and fulcrumed at i for imparting vertical movement to the sleeve in either direction upon the spindle during the rotation of the governor; j, a balance wheel and crank loosely secured to the upwardly extending hub of the rotary supporting collar d, being connected thereto by means of the engaging and releasing movement shown enlarged in the horizontal section Fig. 2, which is taken in the line y—y of Fig. 1. In this movement a ball k, is so held in the tapering chamber l of the hub m, that when the crank j is turned in one direction, rotary motion will be imparted to the collar d, and the connected arms c, c, of the governor; but when turned in the opposite direction the crank will be released from its engagement with the collar so that a reverse motion will not be imparted. And by the employment of this engaging and releasing movement, the rotation of the governor may be readily kept up by means of a back and forth movement of the handle of the crank, instead of a rotary movement, and the mechanical effect of vibratory action be illustrated.

The specific direction of the force of suspension when the balls of the rotating governor are in the position shown in Fig. 1, is indicated by the arrow S; that of the force of gravitation by the arrow G; and that of the force of centrifugal inertia by the arrow C; upon which latter force the resilient sensibility of the governor depends. And while the sliding sleeve e and the operating handle h may schematically represent the faculty of sensation, the loose supporting collar d and the accompanying means for the transmission of energy thereto may represent the faculty of emotion. For, when a variable impulse of rotation is passed through the supporting collar d to the sensible balls b, b, of the governor, their horizontal plane of static equilibrium will be varied with every occurring variation in the impulse transmitted, thus inducing corresponding changes of stress within the governing mechanism. And we may logically presume that an analogous internal change effected in the resilient controlling element of conscious sensibility will result in the development of emotion, while on the other hand externally received impulses will result in sensation.

Inanimate mechanisms are in all cases provided with a supporting frame, which constitutes a fixed fulcrum or reactive base for the dynamic action of the elements of the mechanism, and serves to hold these elements in their proper working relations. Hence the resilient controlling element of conscious sensibility, must be provided with a supporting medium, which serves to maintain the distinct elements thereof in proper operative connection in the presence of adverse energies. Such a supporting medium is schematically represented by the stationary upright spindle $a$, upon which the operating parts of the rotary pendulum governor are held.

The forces of the governor that act specifically upon the rotary collar $d$, are the combined downward and outward forces of gravitation and centrifugal inertia, as indicated by the arrows C and G, acting upon the collar $d$ through the arms $c, c;$ together with the adverse force of support, as indicated by the arrow $S^1$ upon the upright spindle $a$.

The forced upward or downward movement of the sleeve $e$ by means of the lever $h$, causes a corresponding movement of the balls $b, b$, from the zero plane of equilibrium $x, x;$ whereby the centrifugal stress exerted upon the loose collar $d$, through the pendulum arms $c, c$, will be either increased or diminished. And on the other hand, an increase or diminution in the velocity of rotation imparted to the collar $d$, causes an equilibrated elevation or depression of the sleeve $e$, and the balls of the governor, and also an increase or diminution of the centrifugal stress exerted upon the collar $d$, through the pendulum arms. Now considering that the sleeve $e$ represents an organ of sense, and the collar $d$ an organ of emotion, we may infer from the action of our pendulum governor, that the attributes of sensation and emotion are operatively connected in the resilient controlling element of conscious sensibility.

I claim as my invention:

1. In a schematic appliance for illustrating the specific relation that exists between the faculties of sensation and emotion in the resilient controlling element of conscious sensibility in the animal organism, the combination of a stationary, upright spindle, a rotary pendulum governor supported for axial rotation upon said spindle, and having a rotary supporting collar, a sliding sleeve, arms jointed to the collar, balls carried by the arms, and connecting links between the arms and sliding sleeve, with means for imparting rotary movement to the supporting collar, and a hand operated lever connected with the sliding sleeve, whereby the balls of the governor may be optionally forced from their plane of rotary equilibrium and the resulting resilient sensibility of the governor be made manifest.

2. In a schematic appliance for illustrating the specific relation that exists between the faculties of sensation and emotion in the resilient controlling element of conscious sensibility in the animal organism, the combination of a stationary upright spindle, a rotary pendulum governor supported for axial rotation upon said spindle, and having a rotary supporting collar, a sliding sleeve, arms joined to the collar, balls carried by the arms, and connecting links between the arms and the sliding sleeve, with a mechanical engaging and releasing movement for imparting rotary motion to said governor in one direction and not in the other, and a hand operated lever connected with the sliding sleeve, whereby the balls of the governor may be optionally forced from their plane of rotary equilibrium, and the resilient sensibility of the governor be made manifest.

SOCRATES SCHOLFIELD.

Witnesses:
 WALLACE C. PARSONS,
 CHAS. E. SMITH.